(12) United States Patent
Mentovich et al.

(10) Patent No.: US 10,012,809 B2
(45) Date of Patent: Jul. 3, 2018

(54) PRINTED CIRCUIT BOARD ASSEMBLY WITH A PHOTONIC INTEGRATED CIRCUIT FOR AN ELECTRO-OPTICAL INTERFACE

(71) Applicant: Mellanox Technologies, Ltd., Yokneam (IL)

(72) Inventors: Elad Mentovich, Tel Aviv (IL); Itshak Kalifa, Ramat Gan (IL); Sylvie Rockman, Zichron Yaakov (IL); Pierre Avner Badehi, Yehuda (IL); Anna Sandomirsky, Nesher (IL); Evelyn Landman, Haifa (IL)

(73) Assignee: Mellanox Technologies, LTD., Yokneam (IL)

( * ) Notice: Subject to any disclaimer, the term of this patent is extended or adjusted under 35 U.S.C. 154(b) by 0 days.

(21) Appl. No.: 15/187,109

(22) Filed: Jun. 20, 2016

(65) Prior Publication Data

US 2017/0363823 A1    Dec. 21, 2017

(51) Int. Cl.
*G02B 6/12* (2006.01)
*G02B 6/42* (2006.01)

(52) U.S. Cl.
CPC ....... *G02B 6/4245* (2013.01); *G02B 6/12004* (2013.01); *G02B 6/4206* (2013.01); *G02B 6/428* (2013.01); *G02B 6/4284* (2013.01)

(58) Field of Classification Search
CPC .. G02B 6/12004; G02B 6/428; G02B 6/4284; G02B 6/4245; G02B 6/4206
USPC ..................................................... 385/14–15
See application file for complete search history.

(56) References Cited

U.S. PATENT DOCUMENTS

| | | | | |
|---|---|---|---|---|
| 2007/0258683 | A1* | 11/2007 | Rolston | G02B 6/4232 385/88 |
| 2009/0028575 | A1* | 1/2009 | Epitaux | G02B 6/4249 398/139 |
| 2011/0075965 | A1* | 3/2011 | DeMeritt | G02B 6/4214 385/14 |
| 2011/0286695 | A1* | 11/2011 | Wu | G02B 6/42 385/14 |
| 2012/0001166 | A1* | 1/2012 | Doany | G02B 6/4246 257/43 |
| 2012/0301073 | A1* | 11/2012 | DeMeritt | G02B 6/4204 385/14 |

(Continued)

*Primary Examiner* — Thomas A Hollweg
*Assistant Examiner* — Guy Anderson
(74) *Attorney, Agent, or Firm* — Alston & Bird LLP

(57) ABSTRACT

An apparatus and method of assembly are described that provide an improved printed circuit board (PCB) assembly for an electro-optical interface, where more accurate positioning and alignment of electro-optical components can be achieved in an active part of the PCB assembly that is used for the electro-optical interface to meet tighter tolerances in an easier and more cost efficient manner. In particular, a photonic integrated circuit (PIC) is received in a cavity defined in a PCB that includes conductive elements for transmitting electrical signals. An optoelectronic transducer is connected to the PIC to convert between the optical signals and the corresponding electrical signals, and an optical coupler is secured to the optoelectronic transducer and supported by the PIC and/or PCB, where the optical coupler is configured to transmit the optical signals between the optoelectronic transducer and an optical fiber.

20 Claims, 8 Drawing Sheets

(56) References Cited

U.S. PATENT DOCUMENTS

| | | | | |
|---|---|---|---|---|
| 2013/0142211 A1* | 6/2013 | Doany | ................. | G02B 6/4246 |
| | | | | 372/50.12 |
| 2013/0209027 A1* | 8/2013 | Yu | ........................... | G02B 6/12 |
| | | | | 385/14 |
| 2013/0209038 A1* | 8/2013 | Pommer | ................ | G02B 6/424 |
| | | | | 385/76 |
| 2013/0308910 A1* | 11/2013 | Nishimura | ............. | G02B 6/381 |
| | | | | 385/78 |
| 2014/0270778 A1* | 9/2014 | Hui | ................... | H04B 10/2503 |
| | | | | 398/79 |
| 2014/0294342 A1* | 10/2014 | Offrein | ................ | G02B 6/4214 |
| | | | | 385/14 |
| 2014/0294352 A1* | 10/2014 | Ertel | ........................ | G02B 6/32 |
| | | | | 385/93 |
| 2015/0036984 A1* | 2/2015 | Wang | ................... | G02B 6/4214 |
| | | | | 385/89 |
| 2015/0037044 A1* | 2/2015 | Peterson | .............. | G02B 6/4292 |
| | | | | 398/135 |
| 2015/0063760 A1* | 3/2015 | Pommer | ............. | G02B 6/4251 |
| | | | | 385/79 |
| 2015/0331208 A1* | 11/2015 | Moriyama | .......... | H01L 31/0232 |
| | | | | 385/14 |
| 2015/0338585 A1* | 11/2015 | Li | .......................... | G02B 6/423 |
| | | | | 385/31 |
| 2016/0062063 A1* | 3/2016 | Ogura | ................... | G02B 6/428 |
| | | | | 385/14 |
| 2016/0085038 A1* | 3/2016 | Decker | ................ | G02B 6/4204 |
| | | | | 385/14 |
| 2016/0109664 A1* | 4/2016 | Chang | ................... | G02B 6/428 |
| | | | | 385/33 |
| 2016/0216445 A1* | 7/2016 | Thacker | ............. | G02B 6/12004 |
| 2016/0274318 A1* | 9/2016 | Vallance | ................ | G02B 6/428 |
| 2016/0334590 A1* | 11/2016 | Celo | ................... | G02B 6/4225 |

* cited by examiner

PRINTED CIRCUIT BOARD ASSEMBLY WITH A PHOTONIC INTEGRATED CIRCUIT FOR AN ELECTRO-OPTICAL INTERFACE

BACKGROUND

The present disclosure relates in general to electro-optical interfaces for transmitting and receiving optical signals through fiber optic cable systems. In particular, apparatuses and methods of assembling electro-optical interfaces are described that use a photonic integrated circuit for the active part of the printed circuit board to support optoelectronic components including vertical-cavity surface-emitting lasers (VCSELs) and photodiodes.

As technology progresses and the demand for high bandwidth transmission of optical signals over fiber optic networks in data centers increases, the tolerances of components in the optical interconnects become tighter, making optical interconnects more complex and more expensive.

BRIEF SUMMARY

Embodiments of the invention described herein therefore provide improved optoelectronic interfaces and components thereof, as well as improved methods of assembling optoelectronic interfaces, that allow for higher accuracy in the positioning and alignment of optoelectronic components through the use of a photonic integrated circuit in an active part of the printed circuit board assembly that is used for the electro-optical interface.

Accordingly, in some embodiments, a printed circuit board assembly for an electro-optical interface is provided that includes a printed circuit board comprising conductive elements for transmitting electrical signals, where the printed circuit board defines a cavity. The printed circuit board assembly further includes a photonic integrated circuit comprising a layer of silica configured for transmitting optical signals, where the photonic integrated circuit is configured to be received by the cavity defined by the printed circuit board. An optoelectronic transducer is also provided that is connected to the photonic integrated circuit and is configured to convert between the optical signals and the corresponding electrical signals, and an optical coupler is secured to the optoelectronic transducer and supported by the photonic integrated circuit or the printed circuit board, where the optical coupler is configured to transmit the optical signals between the optoelectronic transducer and an optical fiber. Electrical signals received via an input to the printed circuit board are thus transmitted into the photonic integrated circuit, conducted into the optoelectronic transducer for conversion into corresponding optical signals, and transmitted into the optical fiber via the optical coupler, and optical signals received through the optical fiber at the optical coupler are transmitted into the optoelectronic transducer, converted into corresponding electrical signals, and transmitted as electrical signals through the photonic integrated circuit and the printed circuit board.

In some cases, the photonic integrated circuit may comprise a nanophotonic silicon on insulator (SOI) substrate. The nanophotonic SOI substrate may comprise at least one electro-optic component selected from the group consisting of a waveguide, a filter, a photodiode, a light coupling structure, and an electro-optic modulator. Additionally or alternatively, the light coupling structure may comprise at least one of a grating coupler or an in-plane coupler.

In other cases, the printed circuit board may comprise a silicon interposer. The silicon interposer may be connected to the printed circuit board using at least one of a through-silicon via (TSV) or a redistribution layer (RDL). Moreover, in some embodiments, the optical coupler may comprise a 3D glass fanout.

In some embodiments, the optical fiber may comprise a multicore fiber (MCF), whereas in other embodiments the optical fiber may comprise a multimode fiber (MMF) array. The optoelectronic transducer may comprise at least one of a vertical-cavity surface-emitting laser (VCSEL) or a photodiode. The printed circuit board assembly may further comprise at least one of a driver or a transimpedance amplifier (TIA). In some embodiments, the printed circuit board assembly may be configured for use as a flip-chip interconnect.

In other embodiments, a method of assembling a printed circuit board assembly for an electro-optical interface is provided, where the method comprises mounting a photonic integrated circuit within a cavity defined by a printed circuit board, wherein the printed circuit board comprises conductive elements for transmitting electrical signals, and wherein the photonic integrated circuit comprises a layer of silica configured for transmitting optical signals; connecting an optoelectronic transducer to the photonic integrated circuit, wherein the optoelectronic transducer is configured to convert between the optical signals and the corresponding electrical signals; and securing an optical coupler to the optoelectronic transducer, wherein the optical coupler is supported by the photonic integrated circuit or the printed circuit board, and wherein the optical coupler is configured to transmit the optical signals between the optoelectronic transducer and an optical fiber. The electrical signals received via an input to the printed circuit board are thus transmitted into the photonic integrated circuit, conducted into the optoelectronic transducer for conversion into corresponding optical signals, and transmitted into the optical fiber via the optical coupler, and the optical signals received through the optical fiber at the optical coupler are transmitted into the optoelectronic transducer, converted into corresponding electrical signals, and transmitted as electrical signals through the photonic integrated circuit and the printed circuit board.

The photonic integrated circuit may, in some cases, comprise a nanophotonic silicon on insulator (SOI) substrate. The nanophotonic SOI substrate may comprise at least one electro-optic component selected from the group consisting of a waveguide, a filter, a photodiode, a light coupling structure, and an electro-optic modulator. The printed circuit board may comprise a silicon interposer, and the silicon interposer may, in some cases, be connected to the printed circuit board using at least one of a through-silicon via (TSV) or a redistribution layer (RDL). The optical coupler may comprise a 3D glass fanout. In some cases, the optical fiber may comprise a multicore fiber (MCF) or a multimode fiber (MMF) array. Moreover, the optoelectronic transducer may comprise at least one of a vertical-cavity surface-emitting laser (VCSEL) or a photodiode.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
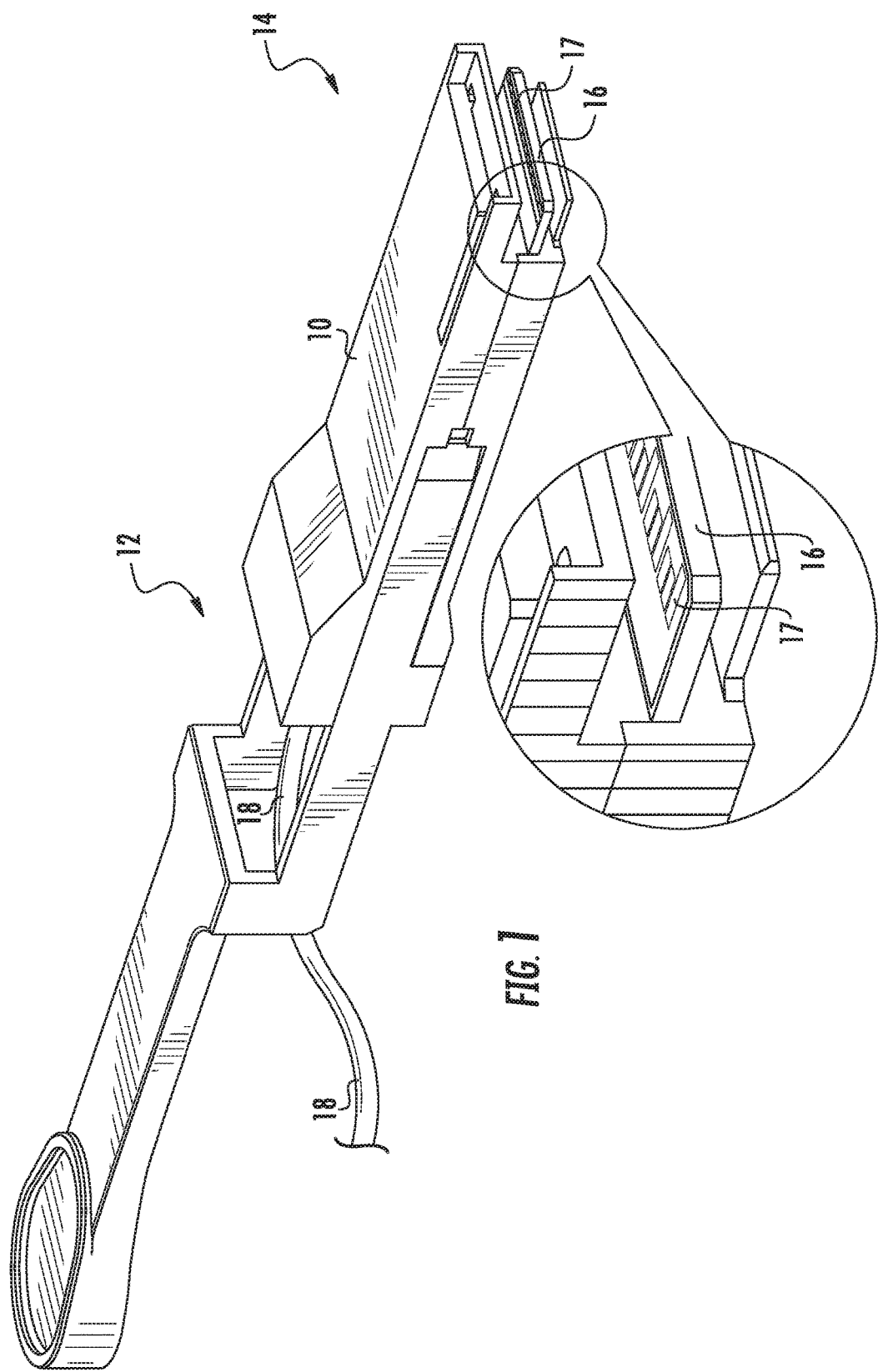
FIG. 1 is a perspective view of a housing for an optoelectronic interface according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As noted above, optical interconnects that are designed to transmit optical signals across short distances (e.g., within a datacenter) typically use discrete components, such as vertical-cavity surface-emitting lasers (VCSELs) and photodiodes, that are connected using discrete components to a lens and ferrule to align the light beam generated by the VCSEL with an optical fiber (in a transmitting scenario), or to align the light beam received from the optical fiber with the photodiode (in a receiving scenario). In some conventional configurations, in a transmitting scenario, a typical VCSEL aperture through which the light beam is transmitted may have a diameter of 8 µm, and the fiber into which the light beam is received may have a diameter of 80 µm, as an example. In this example, passive alignment of the VCSEL aperture with the end of the optical fiber may be adequate and may result in the light beam successfully being received into the optical fiber for transmitting the optical signal. For high bandwidth applications, however, the traces on the printed circuit board supporting the electro-optical interface are increasingly required to have tighter tolerances and better shielding than in conventional devices, such that a light beam must be transmitted between a 5 µm opening and a 70 µm opening, and in some cases even between a 5 µm aperture and a 28 µm aperture (e.g., in enhanced data rate (EDR) technologies). As the diameter of the aperture approaches that of the fiber, alignment of the two becomes more critical, and even very small offsets can result in signal loss or deterioration. Moreover, in certain types of applications, such as in flip-chip technologies (e.g., as compared with wire bonding), the components on a printed circuit board must be accurately located, such that the proper connections can be made when the flip chip is assembled.

As a result of the ever increasing requirements for tighter assembly tolerances in the aforementioned components, the assembly of printed circuit boards has become a bottleneck for the production of optical interconnects. For example, with the active area of VCSELs and photodiodes decreasing to only a few microns as described above, achieving acceptable tolerances in the placement of components on a printed circuit board has become challenging, and the placement of such components is more often becoming determined by pick-and-place instruments, which is close to the limit of acceptable tolerances and results in high yield loss and high cost.

There is thus a growing need to develop complex optical systems with a very accurate printed circuit board substrate that can support the accurate placement of electro-optical components, such as for use in flip-chip applications as well as EDR technologies. Accordingly, embodiments of the present invention provide a printed circuit board assembly that incorporates a photonic integrated circuit (PIC) in the active part of the PCB assembly, where the PIC includes electro-optic components for facilitating the conversion between electrical signals and optical signals and supports one or more optoelectronic transducers (e.g. VCSELs and/or photodiodes).

Figure 2:
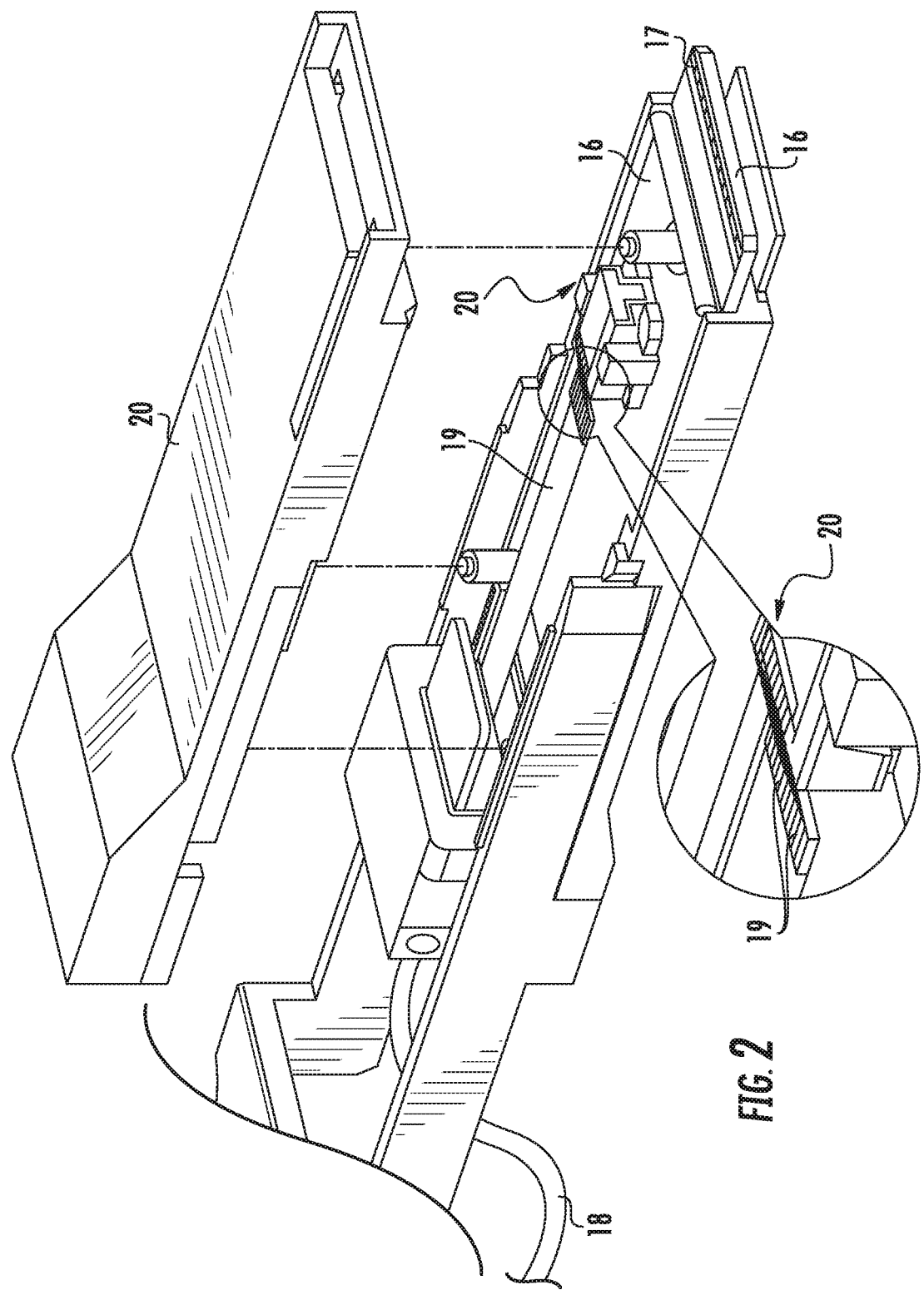
FIG. 2 is a perspective view of the optoelectronic interface of FIG. 1 with the housing open according to an example embodiment.

With reference now to FIG. 1, an optoelectronic interface, which includes the optoelectronic transducer as well as other components (not shown for clarity), is typically enclosed in a housing 10. An external optical cable 18 may be received at one end 12 of the housing 10 of the optoelectronic interface, such as via an optical ferrule holder, and electrical connections 17 may be made at the other end 14 of the housing 10, such as via a printed circuit board (PCB) connector port 16. Multiple optoelectronic interfaces, in their respective housings 10, may in turn be located in switch boxes in the datacenter. FIG. 2 shows the optoelectronic interface of FIG. 1 with the housing 10 opened to allow the optoelectronic interface 20 to be seen. As depicted, the fibers of the external optical cable 18 may pass through the housing in the form of a ribbon 19 that directs each fiber to a corresponding component of the optoelectronic interface 20 (e.g., to a corresponding VCSEL or photodiode of an array of VCSELs and/or photodiodes), as described in greater detail below.

Figure 3:
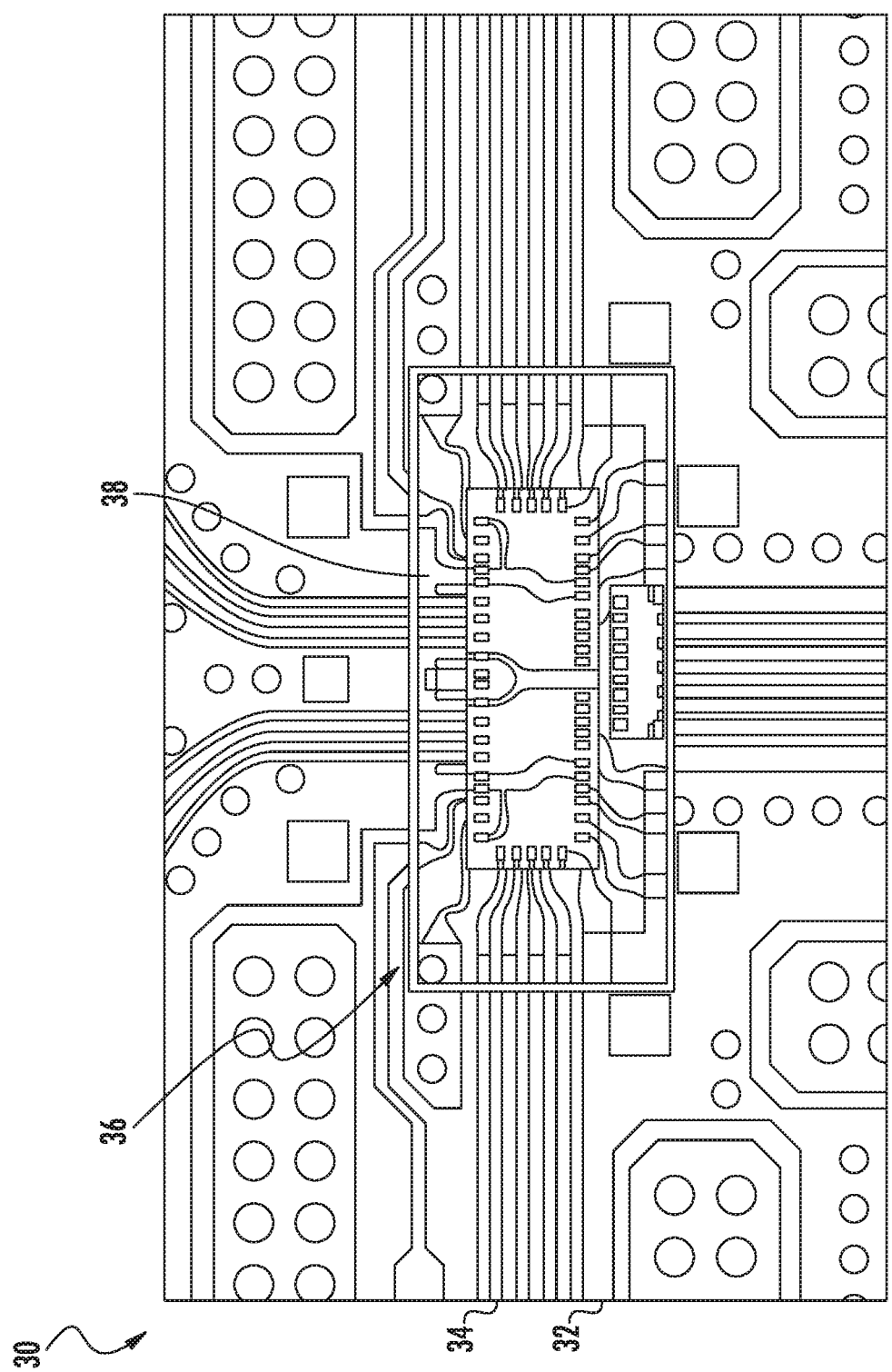
FIG. 3 is a plan view of a printed circuit board (PCB) assembly with a photonic integrated circuit (PIC) according to an example embodiment.
Figure 7:
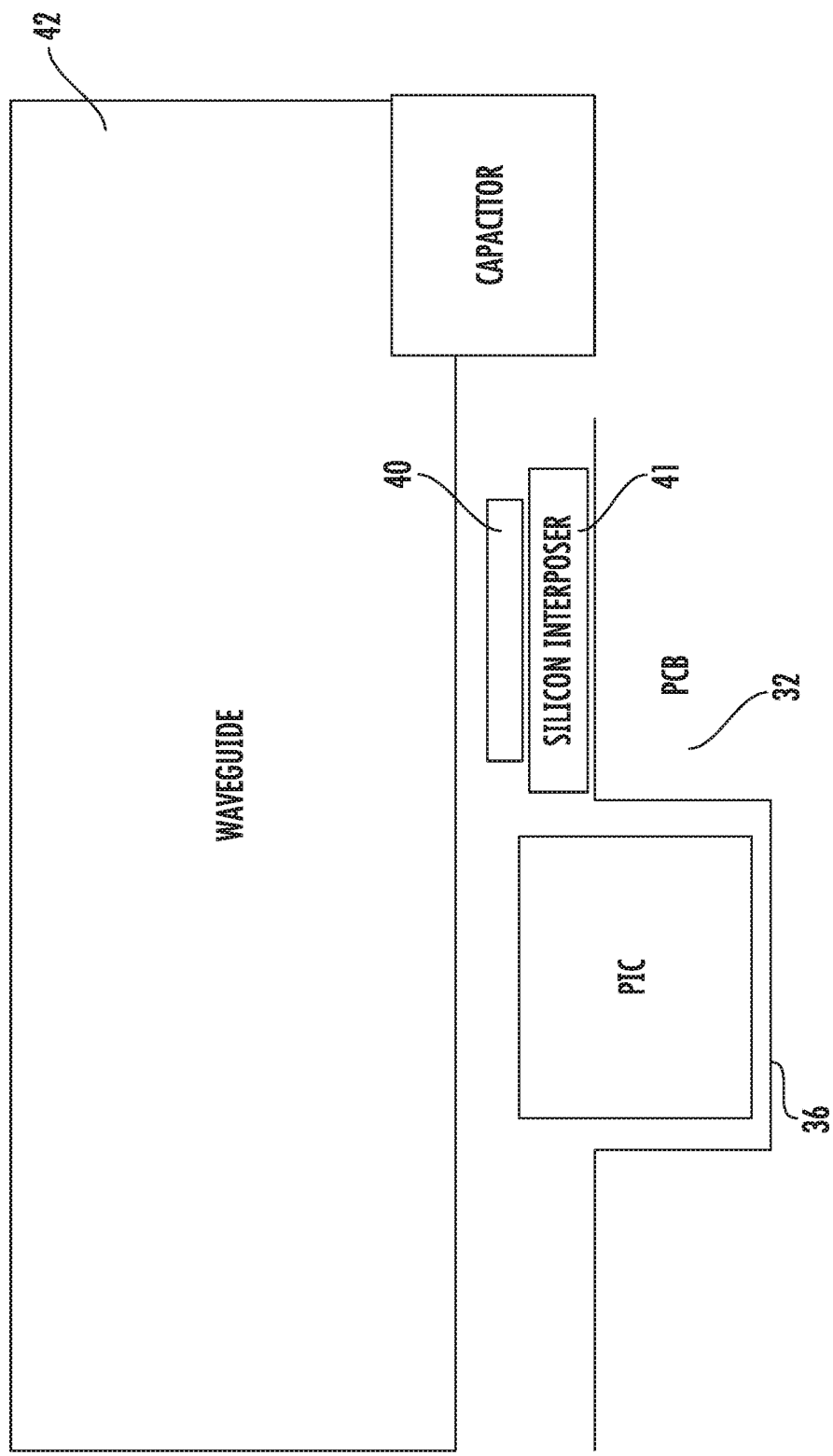
FIG. 7 is a schematic side view illustration of a PCB assembly with a PIC and a silicon interposer and optoelectronic transducer disposed adjacent the PIC.

Unlike conventional PCB assemblies, however, in which the active part (e.g., the portion of the assembly connecting to and enabling the optoelectronic transducer to convert between electrical signals and optical signals) is an area of the PCB and the electro-optic components are directly connected to traces formed on the PCB, embodiments of the PCB assembly 30 described herein provide a PCB 32 that includes conductive elements 34 for transmitting electrical signals, but further defines a cavity 36 corresponding to the location of the active part, as shown in FIG. 3. In some cases, for example, the cavity 36 may be defined such that it has a depth of approximately 220 µm (e.g., within a range of tolerances acceptable to those skilled in the art). A photonic integrated circuit (PIC) 38 comprising a layer of silica configured for transmitting optical signals is received by the cavity 36. The PIC 38 may, for example, be secured within the cavity 36 using a conductive epoxy. In some embodiments, the PIC 38 may have a height of approximately 375 µm and may thus extend out of the cavity (e.g., the cavity having a shallower depth, such as a depth of approximately 220 µm), as shown in FIG. 7.

A PIC is a device that integrates multiple (at least two) photonic functions. The techniques for making PICs are similar to those used to make electronic integrated circuits, in which photolithography is used to pattern wafers for etching and material deposition. Various types of devices may be formed on the PIC, including low loss interconnect waveguides, power splitters, optical amplifiers, optical modulators, filters, lasers and detectors, as described in greater detail below.

In some embodiments, for example, the PIC 38 may comprise a nanophotonic silicon on insulator (SOI) substrate. The nanophotonic SOI substrate may be formed using pure crystal silicon and silicon oxide and may, in some cases, comprise at least one electro-optic component that is formed within the substrate, such as a waveguide 43, a filter, a photodiode, a light coupling structure 45 (e.g., a grating coupler or an in-plane coupler), and/or an electro-optic modulator.

In other embodiments, the PCB 32 may comprise a silicon interposer. The silicon interposer may be connected to the PCB 32 using at least one of a through-silicon via (TSV) or a redistribution layer (RDL). For example, the silicon interposer may be positioned adjacent to the PIC 38 on the PCB 32 using an adhesive. Moreover, in some embodiments, the optoelectronic interface is configured to process signals at a bit rate of up to 50 Gb/s.

Figure 4:
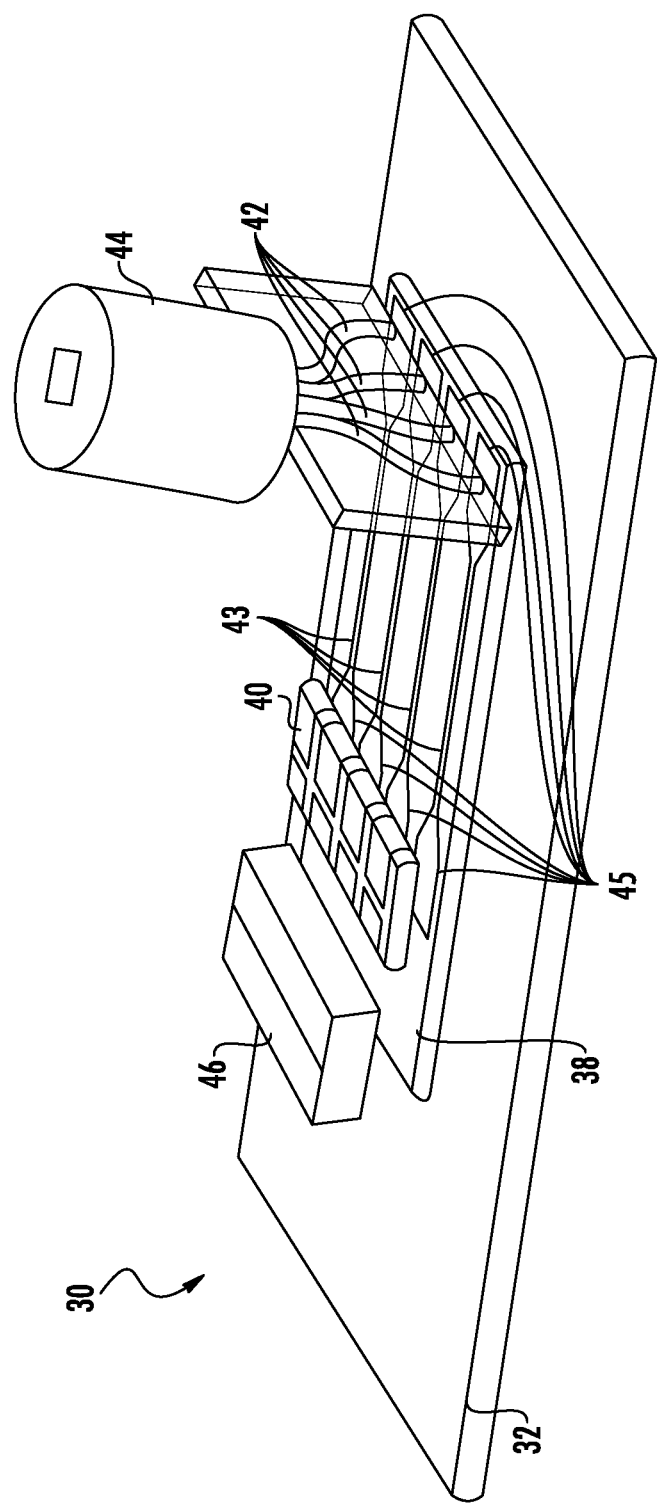
FIG. 4 is a schematic illustration of a PCB assembly with a PIC that includes an array of VCSELs and a corresponding array of VCSEL drivers according to an example embodiment.

With reference to FIG. 4, regardless of the particular configuration used for the PIC platform, an optoelectronic transducer 40 may be connected to the PIC 38 (e.g., disposed on an outer surface of the PIC, as shown in FIG. 4, or on an outer surface of the PCB, adjacent to the PIC 32, as shown in FIG. 7). The optoelectronic transducer 40 may be configured to convert between the optical signals and the corresponding electrical signals. For example, the optoelectronic transducer 40 may comprise a vertical-cavity surface-emitting laser (VCSEL) or an array of VCSELs configured to convert electrical signals into optical signals, in some embodiments, while in other embodiments the optoelectronic transducer may additionally or alternatively comprise a photodiode or an array of photodiodes configured to convert optical signals into electrical signals. For example, in embodiments using a silicon interposer 41, the interposer may have a height of 150 microns to 180 microns and may be positioned between the VCSEL or photodiode 40 and the PCB 32, as shown in FIG. 7.

An optical coupler 42 may further be secured to the optoelectronic transducer 40 and may be supported by the PIC 38, as shown. The optical coupler 42 may be configured to transmit the optical signals between the optoelectronic transducer 40 and an optical fiber 44, such as a multicore fiber (MCF) or a multimode fiber (MMF) array. In this way, electrical signals received via an input to the PCB 32 may be transmitted into the PIC 38, conducted into the optoelectronic transducer 40 (e.g., an array of VCSELs) for conversion into corresponding optical signals, and transmitted as optical signals into the optical fiber 44 via the optical coupler 42. Similarly, optical signals received through the optical fiber 44 at the optical coupler 42 may be transmitted into the optoelectronic transducer 40 (e.g., an array of photodiodes), converted into corresponding electrical signals, and transmitted as electrical signals through the PIC 38 and the PCB 32. In some cases, for example, the optical coupler 42 may comprise a 3D glass fanout, as shown in FIG. 4. The 3D glass fanout may be aligned with the VCSELs and/or photodiodes with reference to alignment marks that may be provided on the optoelectronic interface, such as alignment marks provided on a silicon interposer beneath the VCSELs and/or photodiodes, thereby allowing for higher assembly tolerances and easier assembly process flow.

In some embodiments, the PCB assembly 30 may further comprise at least one of a driver or a transimpedance amplifier (TIA). For example, in a case in which the optoelectronic transducer 40 comprises an array of VCSELs, such as depicted in FIG. 4, an array of VCSEL drivers 46 may be provided, where the VCSEL drivers are in communication with the respective VCSELs. The VCSEL drivers 46 may comprise driving circuitry that is configured to control operation of the optoelectronic transducer 40, such as for directing the emission of light (optical signals) according to the corresponding electrical signals received via the PCB connector port 16 (shown in FIG. 1).

Figure 5:
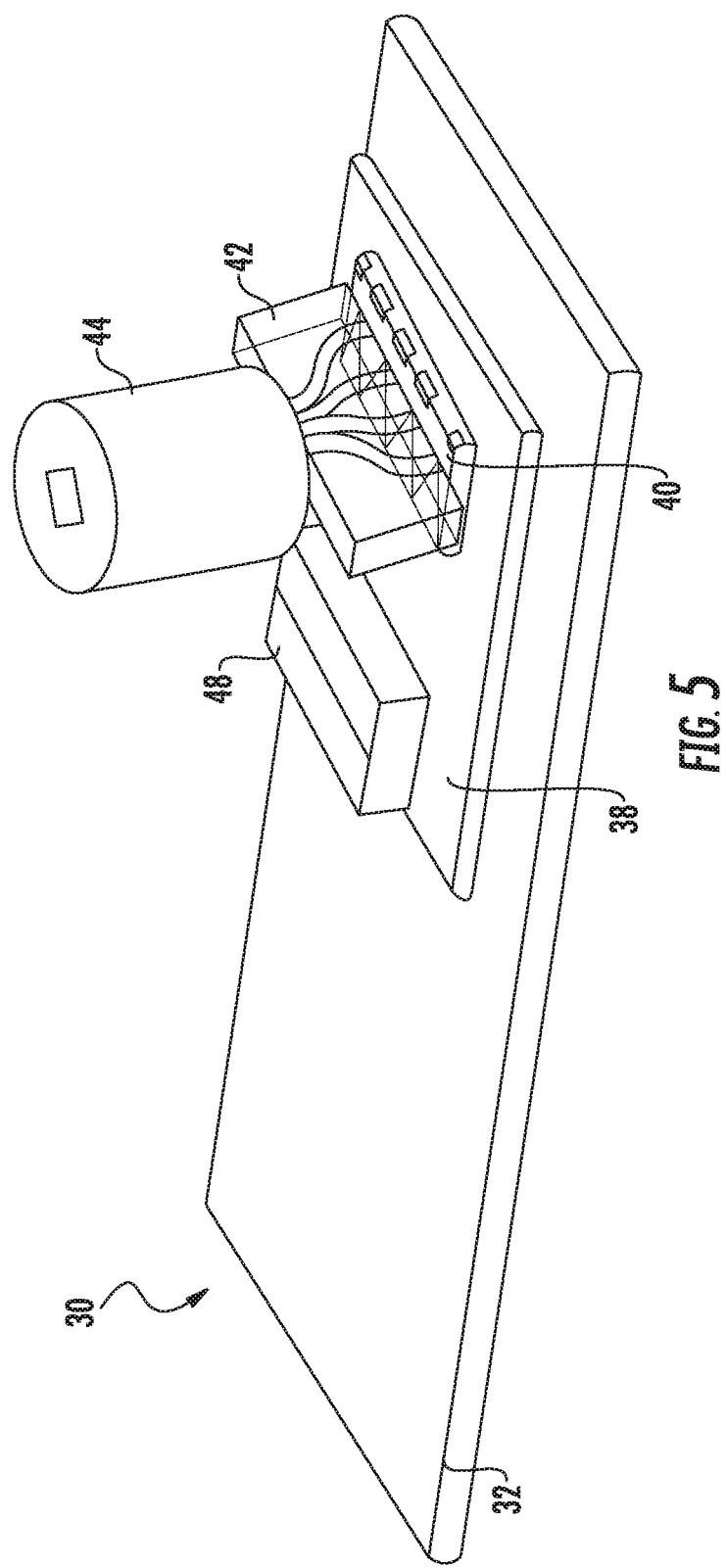
FIG. 5 is a schematic illustration of a PCB assembly with a PIC that includes an array of photodiodes and a corresponding array of transimpedance amplifiers (TIAs) according to an example embodiment.

In another example, depicted in FIG. 5, the optoelectronic transducer 40 comprises an array of photodiodes, and an array of TIAs 48 is provided. The TIAs 48 may be current-to-voltage converters that are used to amplify the current output of the photodiodes 40 to facilitate the transmission of the outputted electrical signals.

Figure 6:
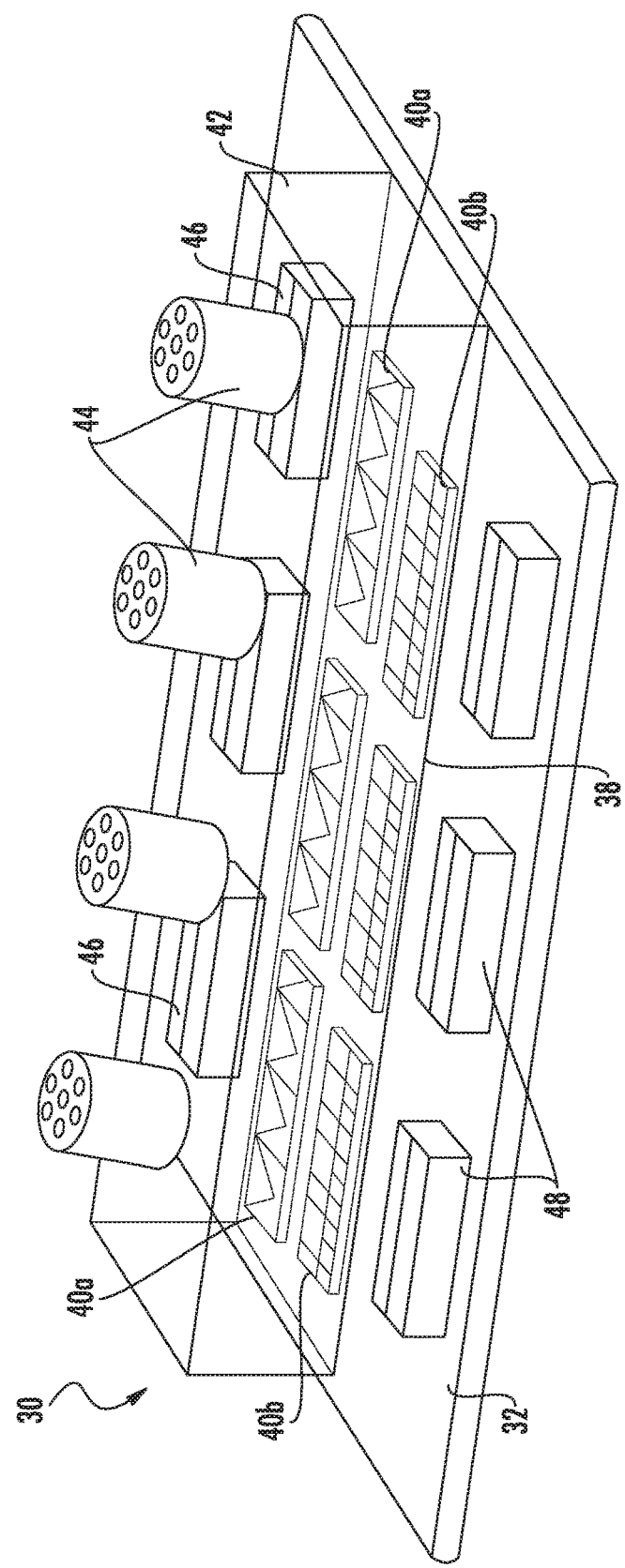
FIG. 6 is a schematic illustration of a PCB assembly with a PIC that includes an array of VCSELs and a corresponding array of VCSEL drivers, as well as an array of photodiodes and a corresponding array of transimpedance amplifiers (TIAs) according to an example embodiment.

In yet another example, shown in FIG. 6, the optoelectronic transducer comprises both an array of VCSELs 40*a* and an array of photodiodes 40*b*. As such, an array of VCSEL drivers 46 is provided in communication with the VCSELs 40*a*, and an array of TIAs 48 is provided in communication with the photodiodes 40*b*. In still other embodiments, not shown, a single multicore fiber (MCF) may be provided that is configured (e.g., sized and positioned) to receive optical signals from a plurality of VCSELS or direct optical signals to a plurality of photodiodes.

Figure 8:
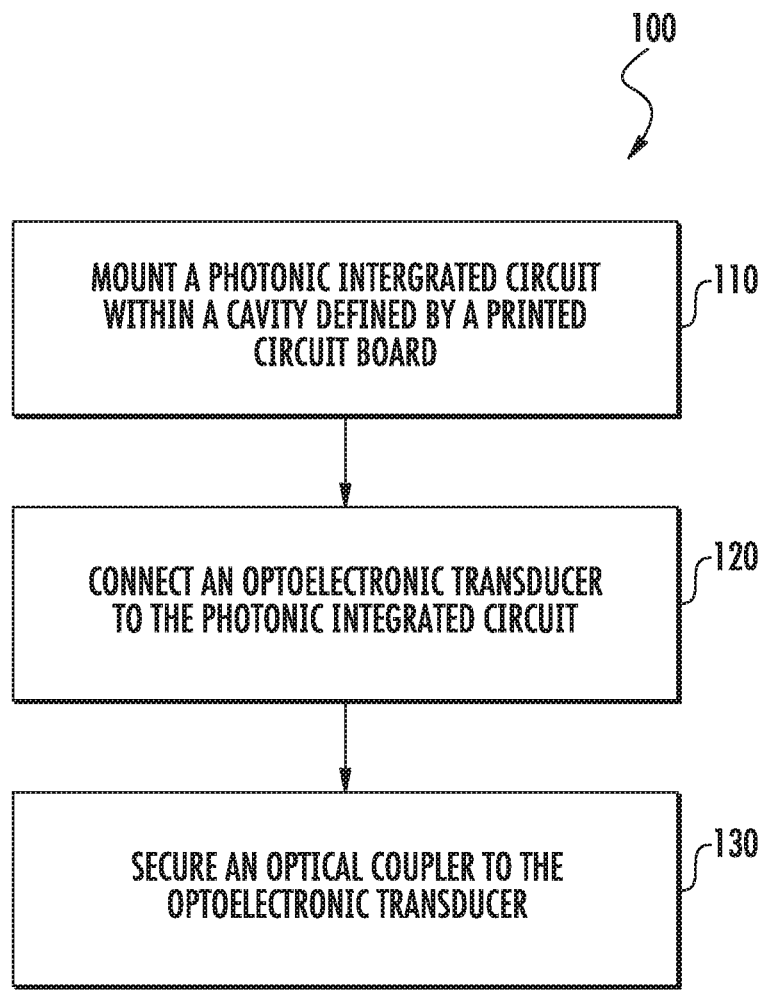
FIG. 8 is a flow chart depicting a method of assembling a PCB assembly having a PIC according to an example embodiment.

With reference now to FIG. 8, in some embodiments, a method 100 of assembling a printed circuit board assembly for an electro-optical interface is provided. According to embodiments of the method, a photonic integrated circuit (PIC) is mounted within a cavity defined by a printed circuit board (PCB) at Block 110, as described above, where the printed circuit board comprises conductive elements for transmitting electrical signals, and where the PIC comprises a layer of silica configured for transmitting optical signals. At Block 120, an optoelectronic transducer may be connected to the PIC. The optoelectronic transducer may be configured to convert between the optical signals and the corresponding electrical signals. An optical coupler may be secured to the optoelectronic transducer at Block 130. The optical coupler may thus be supported by the PIC, and the optical coupler may be configured to transmit the optical signals between the optoelectronic transducer and an optical fiber, as described above.

Accordingly, electrical signals received via an input to the PCB may be transmitted into the PIC, conducted into the optoelectronic transducer for conversion into corresponding optical signals, and transmitted as optical signals into the optical fiber via the optical coupler. Similarly, optical signals received through the optical fiber at the optical coupler may be transmitted into the optoelectronic transducer, converted into corresponding electrical signals, and transmitted as electrical signals through the photonic integrated circuit and the printed circuit board.

In some cases, the PIC may comprise a nanophotonic silicon on insulator (SOI) substrate, and the nanophotonic SOI substrate may comprise at least one electro-optic component selected from the group consisting of a waveguide 43, a filter, a photodiode, a light coupling structure 45, and an electro-optic modulator. In other cases, as described above, the PCB may comprise a silicon interposer. The silicon interposer may be connected to the printed circuit board using at least one of a through-silicon via (TSV) or a redistribution layer (RDL).

In some embodiments, the optical coupler may comprise a 3D glass fanout. Moreover, the optical fiber may comprise a multicore fiber (MCF) or a multimode fiber (MMF) array. As described above in connection with FIGS. 4-6, the optoelectronic transducer may comprise at least one of a vertical-cavity surface-emitting laser (VCSEL) or a photodiode.

The embodiments described above therefore provide a printed circuit board assembly for an electro-optical interface that can be used as a flip chip of the component on a passive silicon photonics platform. The silicon photonic platform may be a single mode platform in which the light is controlled and manipulated through the system (e.g., through electro-optical components embedded in the PIC).

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components (e.g., components that would normally be mounted on the PCB assembly) may also be part of the optoelectronic interface and fiber optic system. Therefore, it is to be understood that the inventions are not to be limited to the specific embodiments disclosed and that modifications and other embodiments are intended to be included within the scope of the appended claims. Moreover, the steps in the method 100 described above may not necessarily occur in the order depicted in FIG. 8, and in some cases one or more of the steps depicted in Blocks 110-130 may occur substantially simultaneously. Although specific terms are employed herein, they are used in a generic and descriptive sense only and not for purposes of limitation.

What is claimed is:

1. A printed circuit board assembly for an electro-optical interface, the assembly comprising:
   a printed circuit board comprising conductive elements for transmitting electrical signals, wherein the printed circuit board defines a cavity;
   a photonic integrated circuit comprising a layer of silica configured for transmitting optical signals, wherein the photonic integrate circuit defines one or more optical waveguides formed within the layer of silica, wherein the photonic integrated circuit is secured within the cavity in electrical communication with the printed circuit board such that a top surface of the photonic integrated circuit is disposed above a top surface of the printed circuit board;
   an optoelectronic transducer connected to the photonic integrated circuit and configured to convert between the optical signals and the corresponding electrical signals; and
   an optical coupler secured to the optoelectronic transducer and supported by the photonic integrated circuit or the printed circuit board, wherein the optical coupler is configured to transmit the optical signals between the optoelectronic transducer and an optical fiber,
   wherein electrical signals received via an input to the printed circuit board are transmitted via the conductive elements on the top surface of the printed circuit board and communicated to conductive elements on the top surface of the photonic integrated circuit, conducted into the optoelectronic transducer for conversion into corresponding optical signals, and transmitted via the one or more optical waveguides defined within the layer of silica of the photonic integrated circuit into the optical fiber via the optical coupler, and
   wherein optical signals received through the optical fiber at the optical coupler are transmitted via the one or more optical waveguides defined within the layer of silica of the photonic integrated circuit into the optoelectronic transducer, converted into corresponding electrical signals, and transmitted as electrical signals through the photonic integrated circuit via the conductive elements on the top surface of the photonic integrated circuit and communicated to the conductive elements on the top surface of the printed circuit board.

2. The printed circuit board assembly of claim 1, wherein the photonic integrated circuit comprises a nanophotonic silicon on insulator (SOI) substrate.

3. The printed circuit board assembly of claim 2, wherein the nanophotonic SOI substrate comprises at least one electro-optic component selected from the group consisting of a filter, a photodiode, a light coupling structure, and an electro-optic modulator.

4. The printed circuit board assembly of claim 3, wherein the light coupling structure comprises at least one of a grating coupler or an in-plane coupler.

5. The printed circuit board assembly of claim 1, wherein the printed circuit board comprises a silicon interposer.

6. The printed circuit board assembly of claim 5, wherein the silicon interposer is connected to the printed circuit board using at least one of a through-silicon via (TSV) or a redistribution layer (RDL).

7. The printed circuit board assembly of claim 1, wherein the optical coupler comprises a 3D glass fanout.

8. The printed circuit board assembly of claim 1, wherein the optical fiber comprises a multicore fiber (MCF).

9. The printed circuit board assembly of claim 1, wherein the optical fiber comprises a multimode fiber (MMF) array.

10. The printed circuit board assembly of claim 1, wherein the optoelectronic transducer comprises at least one of a vertical-cavity surface-emitting laser (VCSEL) or a photodiode.

11. The printed circuit board assembly of claim 10 further comprising at least one of a driver or a transimpedance amplifier (TIA).

12. The printed circuit board assembly of claim 1, wherein the printed circuit board assembly is configured for use as a flip-chip interconnect.

13. A method of assembling a printed circuit board assembly for an electro-optical interface, the method comprising:
   mounting a photonic integrated circuit within a cavity defined by a printed circuit board such that a top surface of the photonic integrated circuit is disposed above a top surface of the printed circuit board, wherein the printed circuit board comprises conductive elements for transmitting electrical signals, and wherein the photonic integrated circuit comprises a layer of silica configured for transmitting optical signals, and wherein the photonic integrate circuit defines one or more optical waveguides formed within the layer of silica;
   connecting an optoelectronic transducer to the photonic integrated circuit, wherein the optoelectronic transducer is configured to convert between the optical signals and the corresponding electrical signals; and
   securing an optical coupler to the optoelectronic transducer, wherein the optical coupler is supported by the photonic integrated circuit or the printed circuit board, and wherein the optical coupler is configured to transmit the optical signals between the optoelectronic transducer and an optical fiber,
wherein electrical signals received via an input to the printed circuit board are transmitted via the conductive elements on the top surface of the printed circuit board and communicated to conductive elements on the top surface of the photonic integrated circuit, conducted into the optoelectronic transducer for conversion into corresponding optical signals, and transmitted via the one or more optical waveguides defined within the layer of silica of the photonic integrated circuit into the optical fiber via the optical coupler, and
wherein optical signals received through the optical fiber at the optical coupler are transmitted via the one or more optical waveguides defined by the layer of silica of the photonic integrated circuit into the optoelectronic transducer, converted into corresponding electrical signals, and transmitted as electrical signals through the photonic integrated circuit via the conductive elements on the top surface of the photonic integrated circuit and communicated to the conductive elements on the top surface of the printed circuit board.

14. The method of claim 13, wherein the photonic integrated circuit comprises a nanophotonic silicon on insulator (SOI) substrate.

15. The method of claim 14, wherein the nanophotonic SOI substrate comprises at least one electro-optic component selected from the group consisting of a filter, a photodiode, a light coupling structure, and an electro-optic modulator.

16. The method of claim 13, wherein the printed circuit board comprises a silicon interposer.

17. The method of claim 16, wherein the silicon interposer is connected to the printed circuit board using at least one of a through-silicon via (TSV) or a redistribution layer (RDL).

18. The method of claim 13, wherein the optical coupler comprises a 3D glass fanout.

19. The method of claim 13, wherein the optical fiber comprises a multicore fiber (MCF) or a multimode fiber (MMF) array.

20. The method of claim 13, wherein the optoelectronic transducer comprises at least one of a vertical-cavity surface-emitting laser (VCSEL) or a photodiode.

* * * * *